United States Patent [19]

Higdon

[11] Patent Number: 4,765,205

[45] Date of Patent: Aug. 23, 1988

[54] METHOD OF ASSEMBLING DRILL BITS AND PRODUCT ASSEMBLED THEREBY

[76] Inventor: Bob Higdon, P.O. Box 58407, Houston, Tex. 77258

[21] Appl. No.: 37,036

[22] Filed: Jun. 1, 1987

[51] Int. Cl.$^4$ .............................................. B21K 5/02
[52] U.S. Cl. .......................... 76/108 A; 76/DIG. 3; 175/229; 175/369; 175/371; 175/340
[58] Field of Search ............ 76/108 R, 108 A, 101 R, 76/101 E, DIG. 3; 175/227, 228, 229, 369, 370, 371, 340, 356, 358

[56] References Cited

U.S. PATENT DOCUMENTS

| | | | |
|---|---|---|---|
| 4,623,027 | 11/1986 | Vezirian | 76/108 A |
| 4,657,091 | 4/1987 | Higdon | 175/371 |

*Primary Examiner*—Roscoe V. Parker
*Attorney, Agent, or Firm*—Neal J. Mosely

[57] ABSTRACT

A method for assembling earth drill bits starts with a hollow shank body with a hollow pin with API regulation threads, for connection to a drill pipe, extending from one side, and hollow nozzle legs extending from the other side cast as a one piece investment casting. Separate leg members are rough formed and machined to shape having a bit body portion, depending leg, and inwardly and downwardly extending bearing journal. Conical roller cutters are supported for rotation on the bearing journals. A passage formed through the bit body portion and depending leg provides for lubrication of the conical roller cutters. The conical roller cutters are secured in place by a liquid lock formed by filling a cavity between the interior of the cutter cone and the journal bearing which is filled with liquid and sealed. The bit body portions fit together and are welded to form a sub-assembly with an end wall for the hollow pin and side recesses receiving the hollow nozzle legs (containing interchangeable hard metal nozzle members) and are welded peripherally to the open end of the hollow shank body. A ceramic or hard-metal insert at the open end of the hollow shank body is secured in place when the shank body and bit body sub assembly are welded together and protects against abrasion from drilling fluid flowing through the hollow pin.

60 Claims, 5 Drawing Sheets

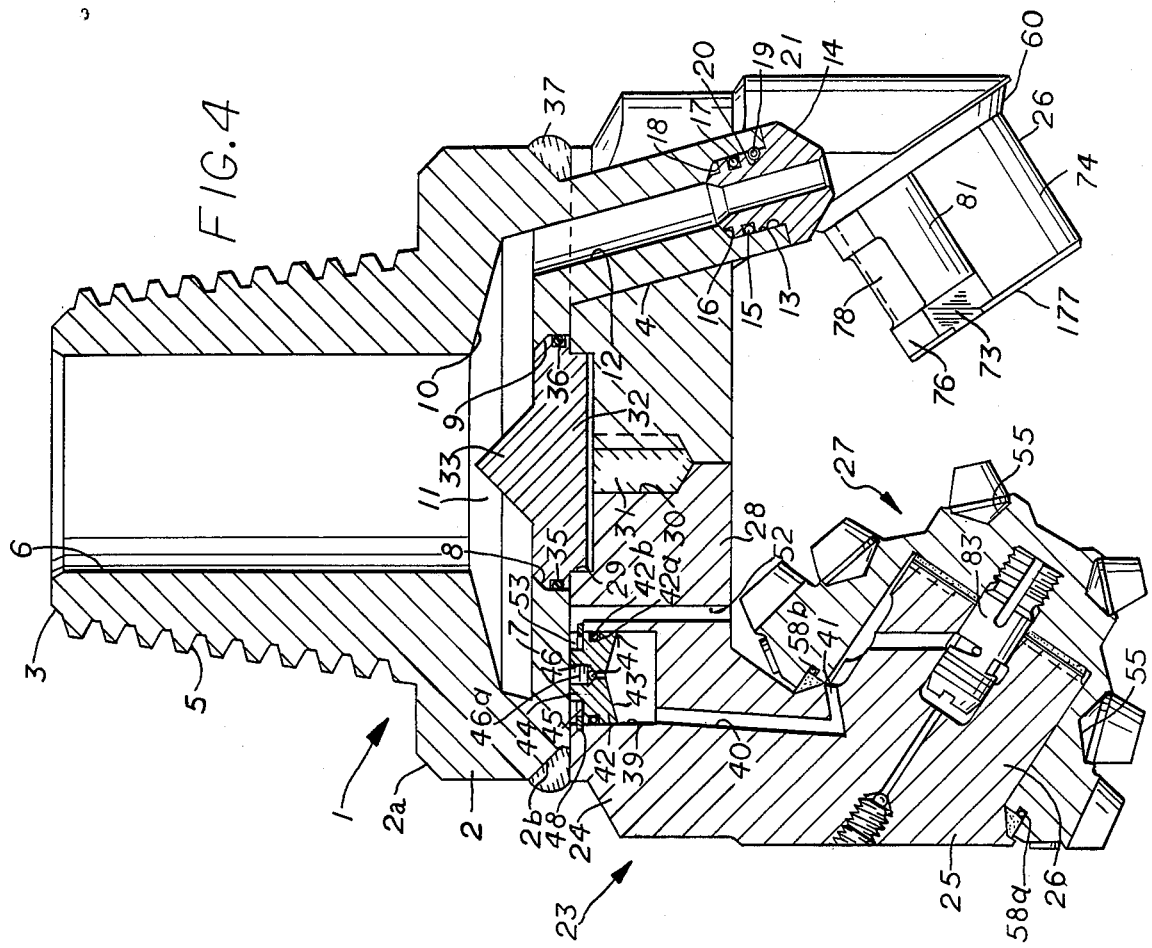
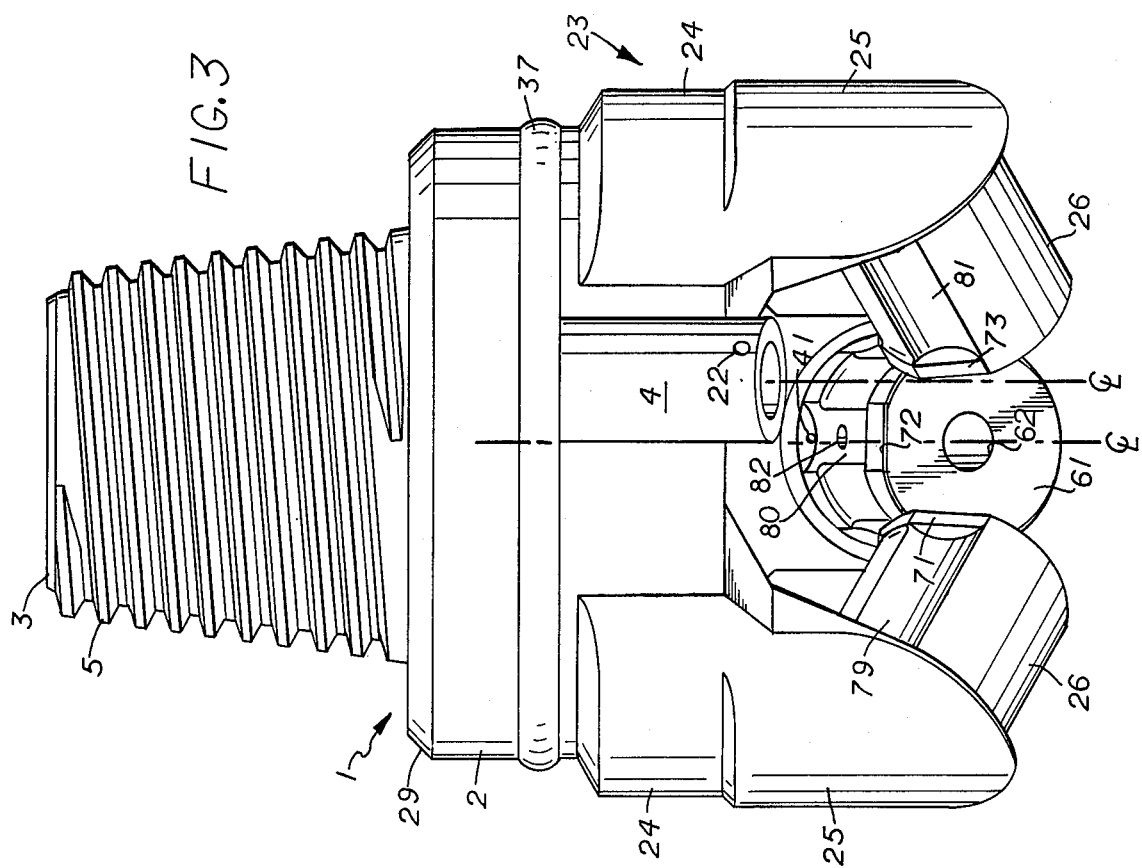

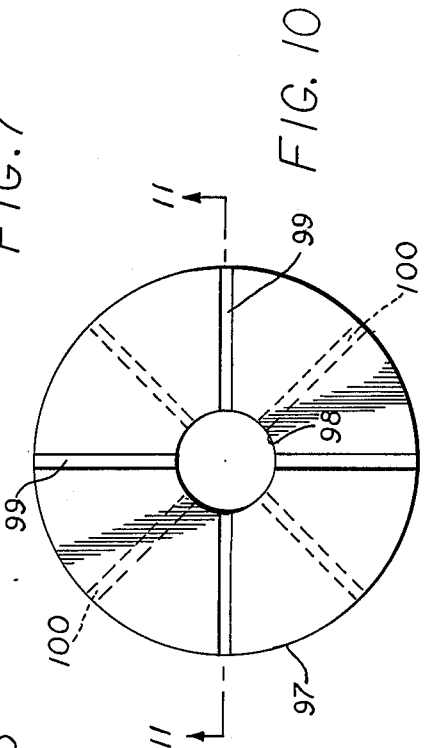
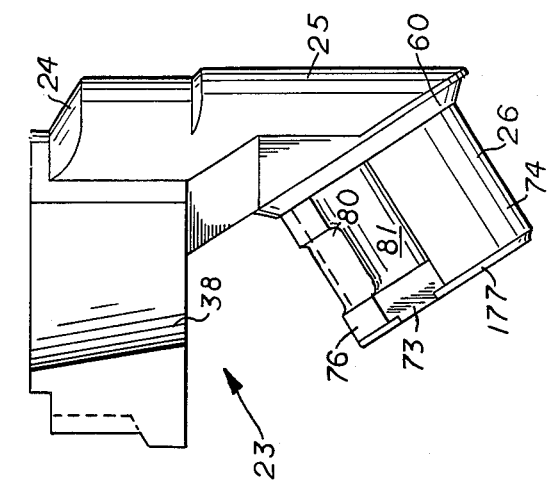
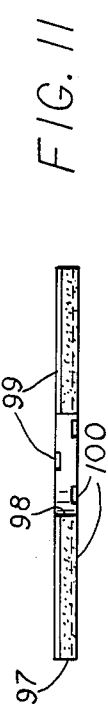
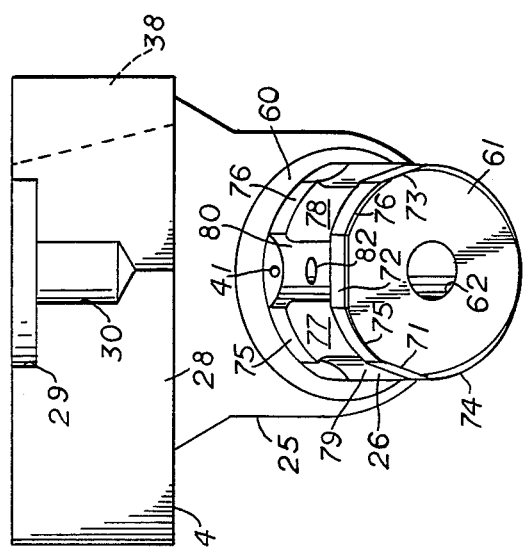
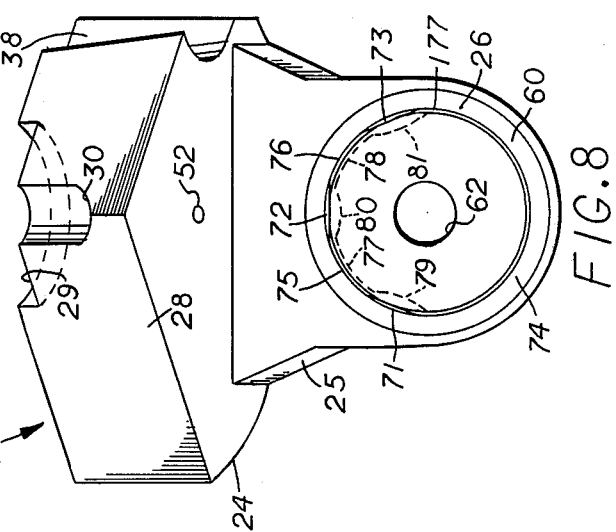
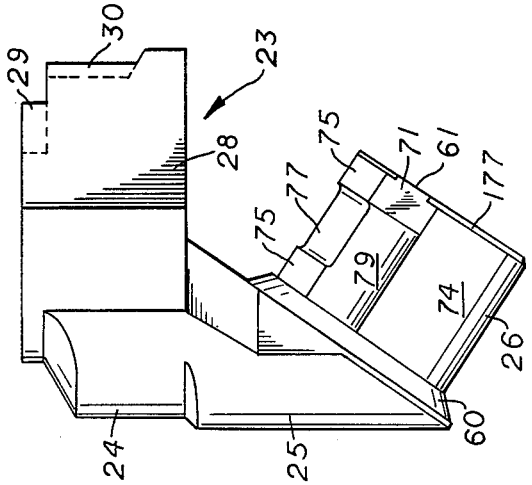
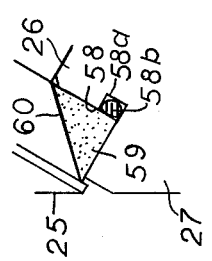

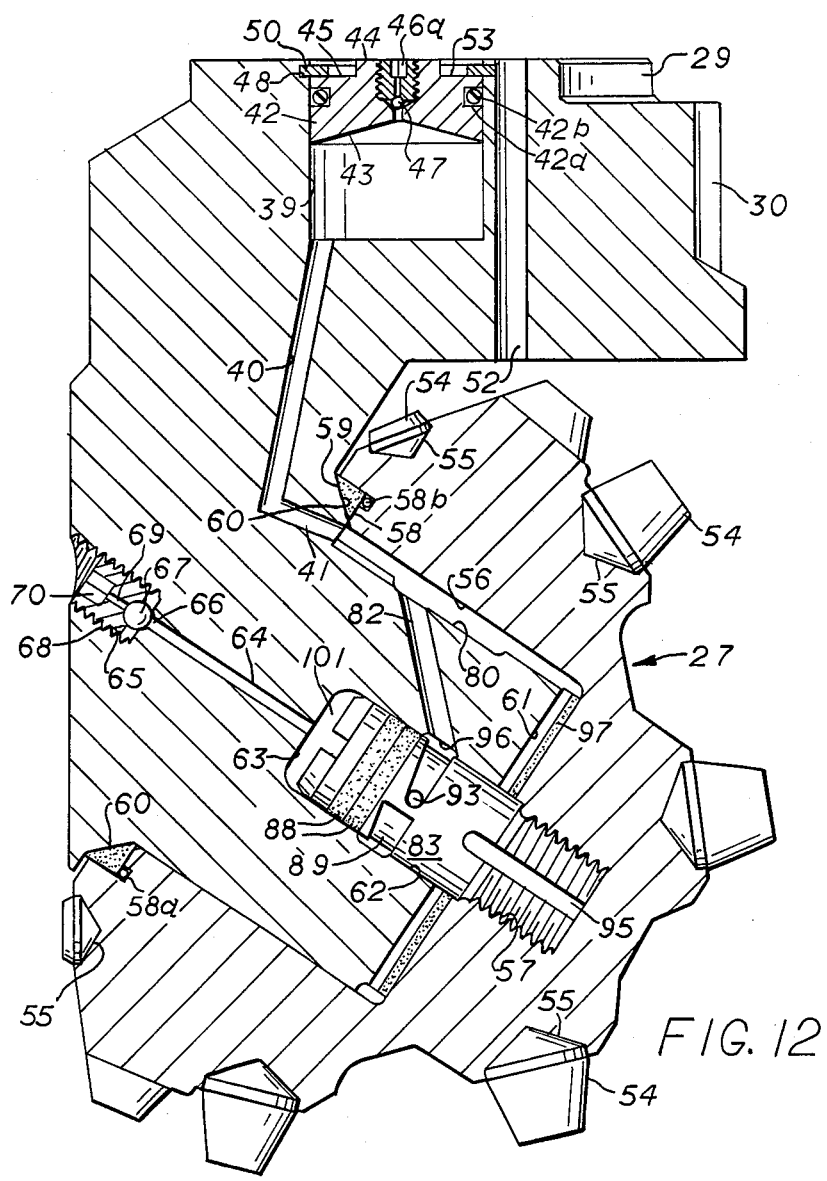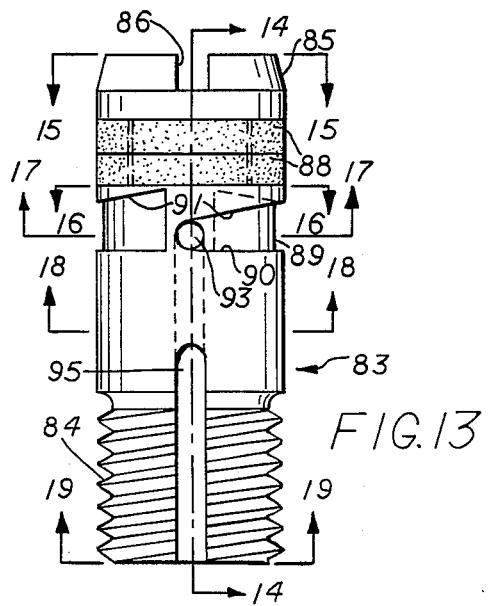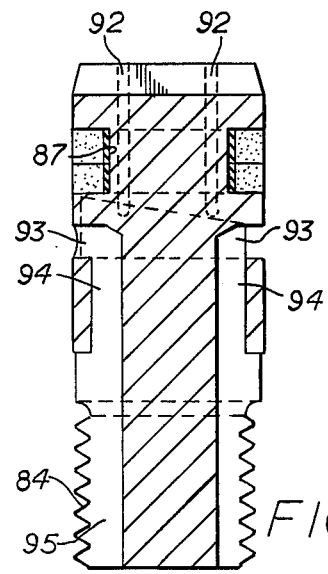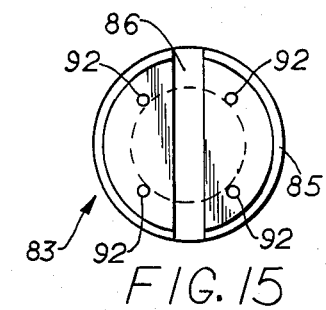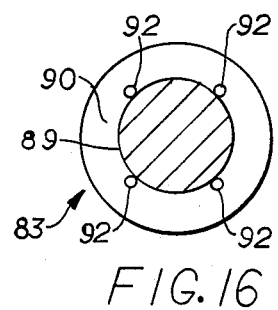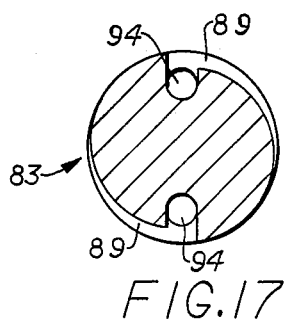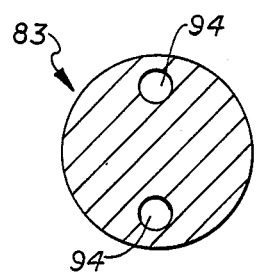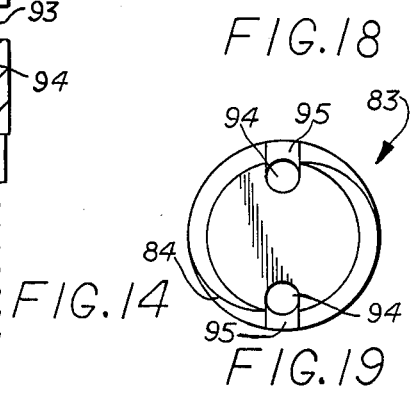

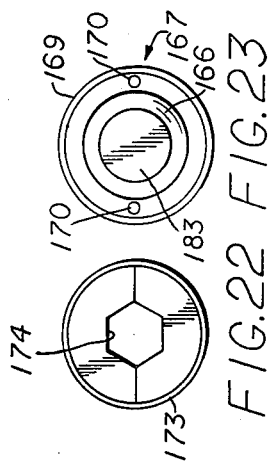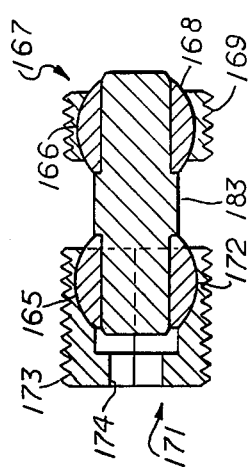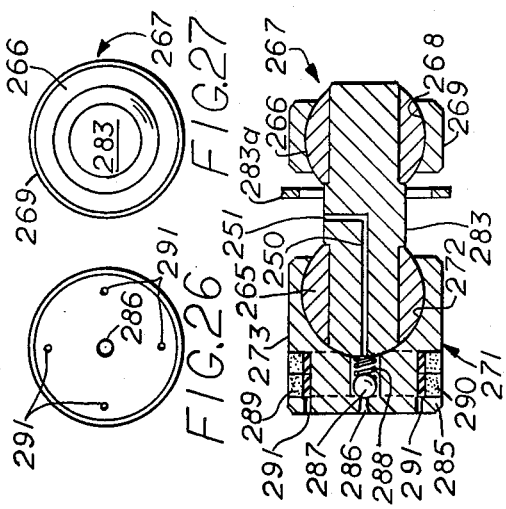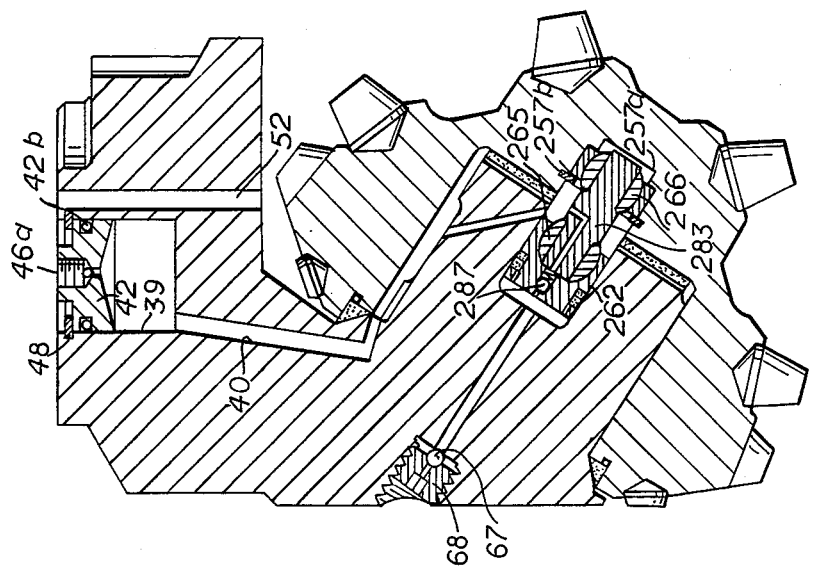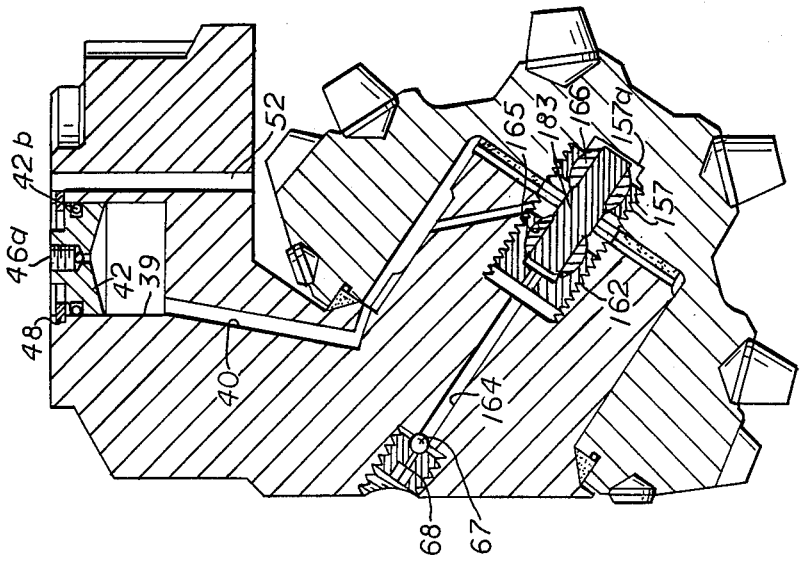

METHOD OF ASSEMBLING DRILL BITS AND PRODUCT ASSEMBLED THEREBY

BACKGROUND OF THE INVENTION

1. Field of the Invention

This invention relates to new and useful improvements in earth drill bits and to methods of assembling such bits.

2. Brief Description of the Prior Art

Roller bits, and particularly three cone roller bits, are well known in the prior art. J. E. Brantly in History of Oil Well Drilling, 1971, Gulf Publishing Co. devoted a very long chapter to the history of development of rotary bits.

The patent literature on roller cone bits is quite prolific on the development of new and improved drill bits through the years. The literature and patents on the manufacture and assembly is not quite so well developed, perhaps because many improved manufacturing techniques are practiced in secret rather than being patented or published.

The preparation of three cone bits by forming the bit body in three separate body segments and welding them together is well known. Brown U.S. Pat. No. 2,831,661 shows one such method of manufacture and assembly. References cited in the Brown patent and other more recent patents shown various methods of manufacture and assembly. The manufacturing process generally used today is one where the bit body is formed in three separate segments including one third of the hollow pin portion, the shank, the depending leg, the inturned bearing journal, and, sometimes, the hollow legs or projections containing the nozzles used in flushing out spoil or cuttings produced in drilling. The three segments are fitted together lengthwise and welded along longitudinal seams. The surface is machined or ground smooth in the welded areas and the entire surface finished off. The hollow pin is then threaded with an API regulation thread or other approved thread and the assembly of the various components completed. This manufacturing operation is lengthy and quite expensive.

The present invention comprises an improved method of assembly of the drill bit body sub-assembly and of the completed bit including the roller cones. The method is considerably simpler than the ones in commerical use today and requires a minimum of finishing operations.

SUMMARY OF THE INVENTION

One of the objects of this invention is to provide a new and improved method of manufacturing and assembling earth drills of the three roller cone type.

Another object of the invention is to provide a new and improved method of manufacturing and assembling earth drills of the three roller cone type by forming separate segments and welding them together.

Another object of the invention is to provide a new and improved method of manufacturing and assembling earth drills of the three roller cone type by means of casting or forming segments and welding them together to produce a finished product requiring a minimum of finish machining.

Still another object of the invention is to provide a new and improved method of manufacturing and assembling earth drills of the three roller cone type by means of casting or forming segments and welding them together and in which the threads on the hollow pin are produced by casting and no further threading operation is required.

Still another object of the invention is to provide a new and improved method of manufacturing and assembling earth drills of the three roller cone type by means of casting or forming segments, including part of the end of the body shank, the depending leg, and the bearing journal, and welding them together into a sub-assembly; casting the pin, body shank, and nozzles as a one-piece casting with the threads cast on the hollow pin so that no further threading operation is required, and welding the sub-assembly to the open end of the body shank.

Yet another object of the invention is to provide a new and improved method of manufacturing and assembling earth drills of the three roller cone type by means of casting or forming segments and welding them together and in which the threads on the hollow pin are produced by casting and no further threading operation is required, and in which the roller cutter cones are secured in place by a liquid lock.

Other objects of the invention will become apparent from time to time throughout the specification and claims as hereinafter related.

The foregoing objects and other objects of the invention are accomplished by the method described below for assembling earth drill bits which starts with a hollow shank body with a hollow pin with API regulation threads, for connection to a drill collar, extending from one side, and hollow nozzle legs extending from the other side cast as a one piece investment casting. Separate leg members are rough formed and machined to shape having a bit body portion, depending leg, and inwardly and downwardly extending bearing journal. The bit body portions fit together and are welded to form a subassembly with an end wall for the hollow pin and side recesses receiving the hollow nozzle legs (containing hard metal nozzle members) and are welded peripherally to the open end of the hollow shank body. A ceramic or hardmetal insert at the open end of the hollow shank body is secured in place when the shank body and bit body sub assembly are welded together and protects against abrasion from drilling fluid flowing through the hollow pin. Conical roller cutters are supported for rotation on the bearing journals. A passage formed through the bit body portion and depending leg provides for lubrication of the conical roller cutters. The conical roller cutters are secured in place by a liquid lock formed by filling a cavity between the interior of the cutter cone and the journal bearing which is filled with liquid and sealed.

BRIEF DESCRIPTION OF THE DRAWINGS

FIG. 3 is a view in elevation of the cast shank body, threaded pin, and nozzle portion of a three cone roller bit assembled by welding to a sub-assembly of the separately cast or formed shank body end portions, depending legs and bearing journals used in carrying out a preferred embodiment of the method constituting this invention.

FIG. 4 is a view partly in elevation and partly in section of the cast shank body, threaded pin, and nozzle portion of a three cone roller bit assembled by welding to a sub-assembly of the separately cast or formed shank body end portions, depending legs and bearing journals used in carrying out a preferred embodiment of the method constituting this invention and further showing the assembly of one of the roller cutter cones on the bearing journal.

FIG. 5 is a view in elevation of the left side of the cast or formed shank body end portion, depending leg and bearing journal segment used in carrying out a preferred embodiment of the method constituting this invention.

FIG. 6 is a view in elevation of the front of the cast or formed shank body end portion, depending leg and bearing journal segment shown in FIG. 5.

FIG. 7 is a view in elevation of the right side of the cast or formed shank body end portion, depending leg and bearing journal segment shown in FIG. 5.

FIG. 8 is a view in elevation of the front of the cast or formed shank body end portion, depending leg and bearing journal segment shown in FIG. 6 rotated to view the end of the bearing journal in plan.

FIG. 9 is a detail view in section of the peripheral seal for the cutter cone.

FIG. 10 is a plan view of a thrust bearing used between the end of the bearing journal and the inside of the cutter cone.

FIG. 11 is a sectional view taken on the line 11—11 of the bearing shown in FIG. 10.

FIG. 12 is a sectional view of the shank body end portion, depending leg and bearing journal shown in FIG. 4 and further showing the liquid lock assembly of one of the roller cutter cones on the bearing journal and the lubrication system.

FIG. 13 is a view in elevation of a shaft member used in the liquid lock for retaining the cutter cone on the bearing journal and showing the seal members in section.

FIG. 14 is a sectional view taken on the line 14—14 of the shaft member shown in FIG. 13.

FIG. 15 is an end view seen from the line 15—15 of the shaft member shown in FIG. 13.

FIG. 16 is a sectional view taken on the line 16—16 of the shaft member shown in FIG. 13.

FIG. 17 is a sectional view taken on the line 17—17 of the shaft member shown in FIG. 13.

FIG. 18 is a sectional view taken on the line 18—18 of the shaft member shown in FIG. 13.

FIG. 19 is a sectional view taken on the line 19—19 of the shaft member shown in FIG. 13.

FIG. 20 is a view, similar to FIG. 12, illustrating an alternate embodiment showing a mechanical connection for securing the cutter cones on the bearing journal to compensate for misalignment due to wear.

FIG. 21 is a detail view of the mechanism for securing the cutter cones on the bearing journal to compensate for misalignment due to wear shown in FIG. 20.

FIG. 22 is a left end view of the mechanism for securing the cutter cones on the bearing journal to compensate for misalignment due to wear shown in FIG. 21.

FIG. 23 is a left end view of the right socket member of the mechanism for securing the cutter cones on the bearing journal to compensate for misalignment due to wear shown in FIG. 21.

FIG. 24 is a view, similar to FIG. 20, illustrating an alternate embodiment showing a mechanical connection, including the liquid lock mechanism, for securing the cutter cones on the bearing journal to compensate for misalignment due to wear.

FIG. 25 is a detail view of the mechanism for securing the cutter cones on the bearing journal to compensate for misalignment due to wear shown in FIG. 24.

FIG. 26 is a left end view of the mechanism for securing the cutter cones on the bearing journal to compensate for misalignment due to wear shown in FIG. 25.

FIG. 27 is a right end view of the right socket member of the mechanism for securing the cutter cones on the bearing journal to compensate for misalignment due to wear shown in FIG. 25.

DESCRIPTION OF THE PREFERRED EMBODIMENT

Figure 1:
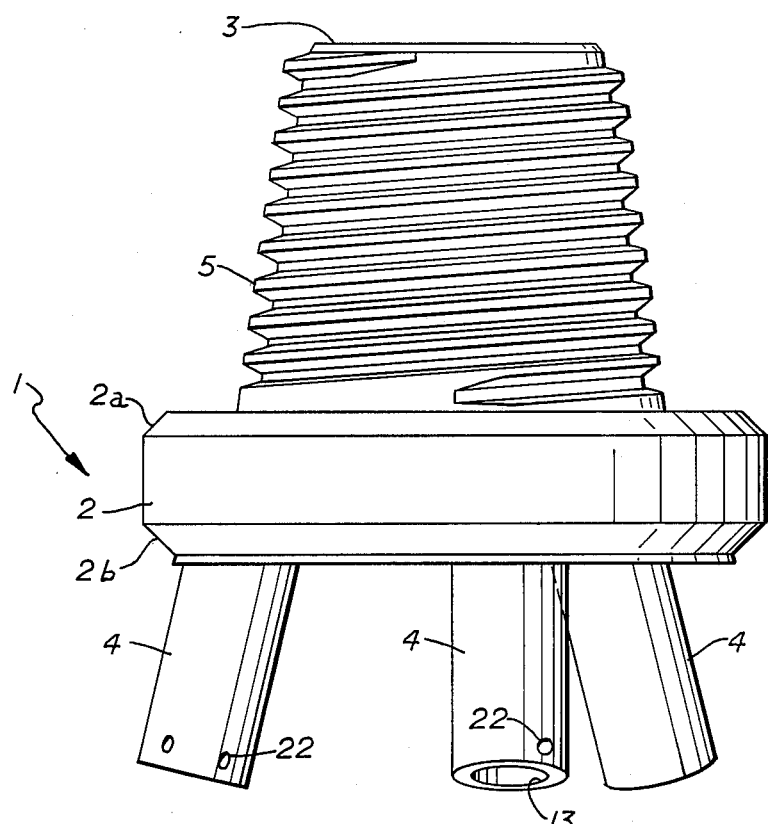
FIG. 1 is a view in elevation of the cast shank body, threaded pin, and nozzle portion of a three cone roller bit used in carrying out a preferred embodiment of the method constituting this invention.

Referring to the drawings by numerals of reference, in FIG. 1, there is shown a shank body portion 1 for an earth drill bit. Throughout this specification, if materials of construction are not specified, the materials used are those commercially used today for similar products or those used in like products in patents and the published literature. Shank body portion 1 comprises shank body 2 having a hollow pin 3 extending from one side and a plurality of hollow nozzle legs 4 extending from the other side. Pin 3 has external male threads 5 (API regulation threads) and an interior longitudinal passage 6. Threads 5 are suitable for connection to a rotary drill collar (not shown) when assembled for use.

Shank body 2 has a cylindrical outer surface with beveled end portions 2a and 2b. Shank body 2 has an end wall 7 with an opening 8 having a 45° shoulder 9 therein. The lower end of passageway 6 has an outwardly flared wall 10 which forms a chamber 11 with end wall 7. Shank body 2, hollow pin 3 and hollow nozzle legs 4 comprising shank body portion are cast as an investment casting with the external male threads 5 (API regulation threads) thereon. No further machining of threads is required, which is a substantial saving in time and cost of producing the drill bit assembly.

Each hollow nozzle leg 4 has a longitudinal passage 12 with a counterbore 13 at its lower end receiving a replaceable flow nozzle 14. Nozzle 14, preferably of tungsten carbide or other hardmetal, has peripheral grooves 15 and 16 receiving sealing O-rings 17 and 18, and retaining ring 19 fitting groove 20 in nozzle 14 and groove 21 in counterbore 13. Retaining ring 19 may be a coil spring member or a solid pin member and is introduced through opening 22 in the wall of hollow nozzle leg 4. Nozzles 14 direct the flow of drilling fluid to flush out the cuttings produced in drilling.

The drill bit assembly has three leg members 23 which are forged, or made by investment casting, as separate pieces. Leg members 23 are subsequently machined to exact dimensions and surface texture. Each leg member 23 is a one piece bit forging, or investment casting, comprising a body portion 24 with a depending leg 25 and an inwardly and downwardly extending bearing journal 26 at the lower end thereof. In the final assembly of the drill bit, each of bearing journals 26 supports a conical roller cutter 27 (FIGS. 4 and 12).

Details and sections of leg members 23 are shown in FIGS. 4–8, and 12. The three bit body portion 24 are fitted together, seen in FIGS. 2 and 4, and welded together to form a sub assembly which is subsequently welded to shank body portion 1 as will be described below. The outer surface of each depending leg is preferably coated with a suitable hard facing, e.g. tungsten carbide or the like, which may be applied either prior to or after welding body portions 24 together.

Each of the leg members 23 has a body portion 24 with a wall portion 28 which, when assembled, fits against the open end wall 7 of shank body member 1. Wall portion 28 has a first recess 29 which is shallow and a second, deeper recess 30 opening from the bottom of recess 29. When the body portions 24 are assembled, as in FIG. 2 and 4, they are welded together along mating surfaces, and particularly in recess 30 which is filled with weld metal 31.

A ceramic, e.g. alumina, or wear resistant hard metal, insert 32 closes the opening 8 in end wall 7 of shank body 2. Ceramic insert 32 has a conical portion 33 and a flat upper surface 34 flush with the inner surface of end wall 7 and facing the flow of drilling fluid through pin passageway 6. Ceramic insert 32 has an edge thickness the same as end wall 7 and an edge bevel fitting 45° shoulder 9. A peripheral groove 35 receives an O-ring 36 for sealing. The bottom of ceramic insert 32 is substantially the same size as and fits into recess 29 in the sub-assembly of body portions 24.

Beveled edge 2b of shank body 2 and the upper face of body portions 24 define a peripheral groove for welding in a peripheral bead 37 (FIGS. 3 and 4). Ceramic insert 32 is positioned in place and secured there when the peripheral welding bead 37 is completed. Each of body portions 24 has an arcuate cut out portion 38 formed or machined therein which, on assembly provides equally spaced slots or recesses which receive nozzle legs 4 which extend to a point close to the cutter cones 27.

Figure 2:
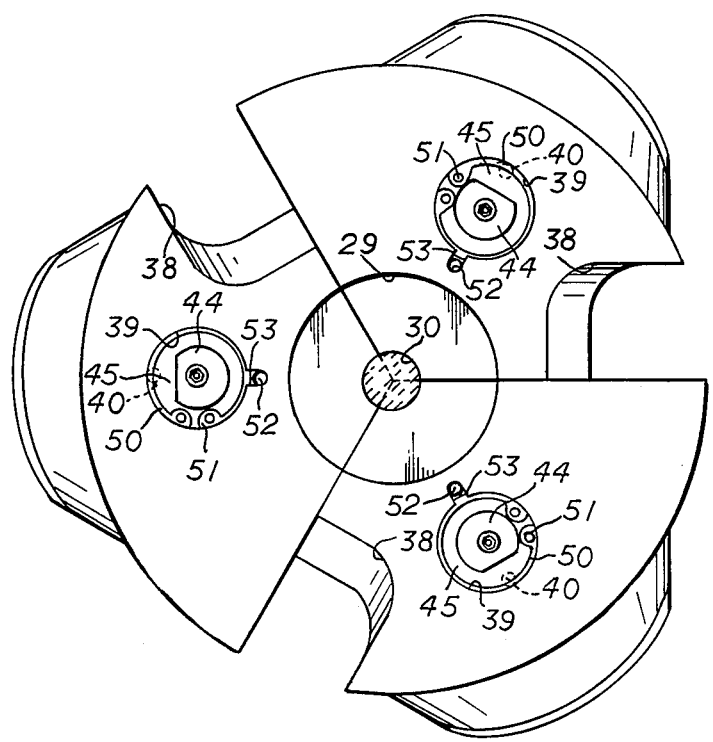
FIG. 2 is a plan view of the sub-assembly of the separately cast or formed shank body end portions, depending legs and bearing journals used in carrying out a preferred embodiment of the method constituting this invention.

A lubrication system is provided for each of the depending legs 24 comprising a plurality of passages and a pumping means to be described below. A cylindrical recess or reservoir 39 is drilled from the upper face of body portion 24 into leg 25 (FIGS. 2 and 4). A passageway 40 extends from the end wall of recess 39 and at its end intersects a side passageway 41 drilled from the outer surface of bearing journal 26 open to the space between the surface of bearing journal 26 and the interior of cutter cone 27 adjacent to depending leg 25.

A piston 42 is slidably positioned in reservoir 39 for maintaining lubricant under pressure therein. Piston 42 has a lower end face 43 of negatively conical shape and an upper end face 44 with a surrounding recessed portion 45. Piston 42 has a surrounding groove 42a in which there is positioned an O-ring 42b which seals against leakage of lubricant from reservoir 39.

A passageway 46 opens through piston 42 from upper face 44 to lower face 43 and is closed by check valve 47. Passageway 46 and check valve 47 comprise a conventional grease or lubricant fitting permitting the apparatus to be bled of air while being filled with lubricant. An annular recess 48 extends around the wall of reservoir or recess 39 adjacent the top thereof and receives a lock ring 50 having holes 51 to receive an insertion tool. A passageway 52 extends from the lower face of wall portion 28 to the upper face thereof and is connected by side opening 53 to the space above the recessed end wall portion 45 of piston 42.

Reservoir 39 is filled with lubricant and pressurized. The lubricant is circulated by a pump provided in the shaft which is part of the mechanism to secure cutter cone 27 on bearing journal 26 as described below. As described above, piston 42 has a valve seat in passageway 46 and ball valve 47 which is held shut by the ball under pressure of threaded closure plug 46a. When the drill bit is assembled and placed in use down hole, mud pressure enters through passageways 52 and 53 to maintain the top of piston 42 under ambient hydraulic pressure. This lubricant reservoir system compensates internal and external differential pressure and equalized the pressure across the conical seal of the cutter cones.

Roller cutter cone 27 has holes or recesses in the surface thereof receiving tungsten carbide, or other hard-metal, inserts 54 which are secured therein by spot fusing a nickel-silver brazing alloy therein as indicated at 55. Cutter cone 27 has a first recess 56 sized to fit over bearing journal 26. A smaller threaded recess 57 opens from the bottom of recess 56 and receives the threaded end of a shaft used in supporting cutter cone 27 on bearing journal 26. Cutter cone 27 has a counterbore at its open end providing a shoulder 58 which receives seal ring 59 having a 45° right triangular cross section. An annular groove 58a receives an O-ring 58b which seals the back side of seal ring 59 and provides a pre-load pressure on seal ring 59 against conical sealing boss 60. When cutter cone 27 is installed on bearing journal 26, seal ring 59 engages a 45° conical boss 60 at the junction of bearing journal 26 and leg 25.

Bearing journal 26 has a flat thrust bearing face through which there opens a recess 62 for receiving the supporting shaft for cutter cone 27. End wall 63 of recess 62 has a passageway 64 extending to a threaded recess 65 extending inward from the outer surface of leg member 25. Passageway 64 has valve seat 66 at its intersection with threaded recess 65. Ball valve 67 closes valve seat 66 and is held there by threaded plug 68 which has a bleed passage 69 and a recess 70 shaped to receive an Allen wrench or like tool for installation and removal.

The exterior surface of bearing journal 26 is configured to provide a system of chambers and passages for a system for pumping lubricant as is described below. Flats 71, 72 and 73 are machined in the surface of bearing journal 26 and divide the remaining surface into surface 74 comprising a major cylindrical arc and surfaces 75 and 76 which are arcuate walls of passages defined by undercuts 77 and 78. Deeper undercuts 79, 80 and 81 define pump chambers. Edge groove 177 extends around the edge of bearing journal face 61 along the edge of arcuate surfaces 74, 75 and 76. Passage 82 extends inward from chamber 80 to intersect recess 62 in which the cutter cone retaining and pumping shaft is positioned.

In FIGS. 12-19, there are shown details of the shaft 83 which is used in retaining cutter cone 26 on bearing journal 26 and which provides the pump mechanism for pumping lubricant. Shaft 83 is cylindrical along its entire length and has exterior male threads 84 which fit female threaded recess 57 in cutter cone 27. Shaft 83 has a beveled end portion 85 which facilitates insertion into journal recess 62 and a slot 86 to receive a screwdriver for assembly. Adjacent to beveled end 85 is an undercut region 87 which receives a pair of elastomeric (carbon graphite or bronze filled polymer material, e.g., teflon) seal rings 88.

Shaft 83 has a second undercut region 89 having a planar wall 90 on one side and a helical wall 91 on the other side. Undercut region 89 and particularly helical wall 91 function as a screw pump when installed in journal recess 62. Four longitudinal passages 92 are drilled from the beveled end of shaft 83 into groove or undercut 87 to provide relief for seal rings 88 when subjected to excessive temperature and pressure. Pump ports 93 open from opposite sides of pump groove 89 and intersect longitudinally extending discharge passages 94. A pair of grooves 95 connect with the ends of passages 94 and extend through the threaded end portion of the shaft. As will be noted below, pump groove 89 cooperates with a peripheral recess 96 in the mid-region of journal recess 62 in the region where passage 82 intersects therewith. A carbon-graphite, or beryllium-copper end thrust bearing 97 has a central opening 98 to fit around shaft 83 and has grooves 99 in one face and grooves 100 in the other face to provide passages for circulation of lubricant when the cutter cones 27 are installed and rotated.

SEQUENCE OF MANUFACTURE AND ASSEMBLY

As described above, the shank body 2, hollow pin 3 and hollow nozzle legs 4 comprising shank body portion are cast as an investment casting with the external male threads 5 (API regulation threads) thereon. No further machining of threads is required, which is a substantial saving in time and cost of producing the drill bit assembly.

Leg members 23 are rough forged and subsequently machined to exact dimensions and surface texture. Leg members 23 may also be produced by investment casting. Each leg member 23 is a one piece bit forging (or casting) comprising a body portion 24 with a depending leg 25 and an inwardly and downwardly extending bearing journal 26 at the lower end thereof. The three bit body portions 24 are ultimately fitted together and welded to form a sub assembly which is in turn welded to shank body portion 1. The outer surface of each depending leg is coated with a suitable hard facing, e.g. tungsten carbide or the like, either prior to or after welding body portions 24 together.

Each cutter cone 27 is prepared for installation by positioning seal ring 59 in peripheral groove 58, sealed by O-ring 58a. Shaft 83 is prepared by placing seal rings 88 in position in groove 87. Shaft 83 is then installed by screwing threaded end portion 83 into threaded recess in cutter cone 27 using a screw driver in slot 86. Thrust washer 97 is then fitted over shaft 83 against the bottom wall of recess 56 and the cutter cone assembly is ready for installation.

The cutter cone assembly is then installed by inserting the beveled end of shaft 83 into recess 62 as far as it will go. In this position, as seen in FIGS. 4 and 12, peripheral seal 59 is in sliding engagement with 45° boss 60 and pre-loaded by O-ring 58a. End thrust bearing 97 engages the end thrust surface 61 of journal 26 and the bottom wall of recess 56 in cutter cone 27. Helical pump slot 89 is located at the inlet chamber defined by recess 96. Seal rings 88 have a tight sliding engagement with the wall of recess 62. The slotted end of shaft 83 is spaced from the end wall 63 of recess 62 and defines a locking chamber 101.

A suitable non-volatile liquid, preferably a high temperature lubricant, is introduced to fill locking chamber 101 and passage 64 to the valve opening 66. Ball 67 is dropped into place and plug 68 is inserted. Passage 69 allows excess lubricant and air to bleed out while plug 68 is tightened against ball 67. When fully tightened, plug 68 seals the system tightly, which is completely full of liquid and has no air therein. If desired, a vacuum may be applied to assist in bleeding the system during filling and closing the plug and valve.

The liquid lock produced is substantially as described and claimed in patent application Ser. No. 730,550, now U.S. Pat. No. 4,657,091. This arrangement holds cutter cone 27 on journal 26 without the necessity of using retaining balls or rings. The vacuum produced by any effort to move cutter cone 27 longitudinally on journal 26 retains the cutter cone in position. Elastomeric seal rings 88 prevent leakage of liquid out or air into locking chamber 101. At the high temperatures encountered in deep wells, the seal rings may expand and attempt to extrude past shaft 83. Passages 92 in the shaft permit such expansion to take place inside the shaft rather than around it. The arrangement shown permits cutter cone 27 and shaft 83 to rotate together while securing them on journal 26. As will be described below, the rotation of shaft 83 with cutter cone 27 provides the pumping action for circulating lubricant.

After the cutter cone 27 and shaft 83 are installed, as described above, the lubricant system is filled with a suitable high temperature liquid lubricant of the type conventionally used in earth drill bits. Liquid lubricant is introduced into each leg 25 through opening 46. The system is filled completely and bled, as necessary, to insure complete filling.

Lubricant fills pump groove 89, all lubricant passages in and around shaft 83, passages 99 and 100 in end thrust bearing 97, all spaces and cavities between the outer surface of journal 26 and wall of cutter cone recess 56, and the passages leading back to and including the reservoir 39 until piston 42 is pressed against retaining ring 50. Plug 46a is screwed into place against ball valve 47 to close the fill opening 46.

The system is pressurized to force lubricant remain in the region of the pump provided by shaft 83. When the drill bit is used, the rotation of cutter cones 27 on the bottom of the hole being drilled causes shafts 83 to rotate and operate the helical pump groove 89 to draw liquid lubricant through passage 82 and inlet recess 96 and discharge lubricant through ports 93 and passages 94, 95, 99 and 100 to the space around journal 26 requiring lubrication.

The body portions 24 are then assembled, as in FIGS. 2 and 4, and welded together along mating surfaces, and particularly in recess 30 which is filled with weld metal 31. Ceramic insert 32 is positioned in recess 29 and secured there when the peripheral welding bead 37 is completed. The mass of the metal of the drill bit assembly is generally sufficient to keep the overall temperature produced during welding below a level where damage occurs to the seals or the lubricant.

When the drill bit is assembled and placed in use down hole, mud pressure enters through passageways 52 and 53 to maintain the top of piston 42 under ambient hydraulic pressure. This lubricant reservoir system compensates internal and external differential pressure and equalized the pressure across the conical seal of the cutter cones.

In completing the body assembly, nozzle legs 4 extend through arcuate cut out portions 38 and extend to a point close to cutter cones 27. The nozzle legs 4 are directed so that the drilling fluid exits the nozzles 14 downwardly and opposite to the direction of rotation of the bit. The jet flow (mud or other drilling fluid) from nozzles 14 strikes or impinges the outer edge gage row of inserts 54, the cone body and the adjacent row of inserts. About 25% of the mud jet strikes or impinges the cone and the other 75% is directed at the gage wall at or near the bottom just before the gage inserts ream the side of the well bore, reflecting off the side of the wall to the bottom of the well bore or hole. The jet mud pressure striking the heel row and the gage end interruption (25%) generates enough power to rotate the cone at a high speed (RPM) when the bit is lifted off bottom. This arrangement is therefore useful for cleaning the bit from material which has balled up on the bit in plastic formations. The cone is spun like a water wheel to throw off debris by centrifugal force which would otherwise tend to stick to the cones or roller cutters.

OTHER EMBODIMENTS OF THE INVENTION

In a drill bit of the design described above, a problem may arise if there is uneven wear on the cutter cone bearings so that there may be a small misalignment of cutter cone 27 relative to bearing journal shaft 26. In FIGS. 20-27, there are shown details of two embodiments of a universal joint for retaining cutter cone 27 on bearing journal 26 while permitting even rotation of the cutter cones after development of misalignment due to wear.

FIGS. 20-23 illustrate a universal joint for retaining cutter cone 27 on bearing journal 26 while permitting even rotation of the cutter cones after development of misalignment due to wear, for use in small diameter drill bits which do not use the liquid lock retention mechanism. In these Figures, the parts which are the same as in the first embodiment are given the same reference numerals and function as in that embodiment.

In FIG. 20, journal recess 162 and cone recess 157 are both threaded. Recess 157 has a small counterbore 157a at the end which receives the projecting end portion of the bearing portion of the universal joint. Journal passage 164 is of a size sufficient to receive an Allen wrench for installation of the retention mechanism. The retention mechanism comprises a shaft 183 having end portions of reduced diameter tightly fitted in ball shaped bearing members 165 and 166.

Cylindrically shaped socket member 167 has a spherical inner bearing surface 168, receiving bearing member 166, and threaded external surface 169 to fit threaded cone recess 157. Socket member 167 may be formed as one piece over bearing ball member 166 or may be formed in two pieces as a split nut. In either version the left end face of socket member 167 has two holes 170 to receive a spanner wrench for installation.

Socket member 171 has a spherical inner bearing surface 172, to receive bearing member 165, and threaded cylindrical external surface 173 to fit threaded journal recess 162. Socket member 171 may be formed as one piece over bearing ball member 165 or may be formed in two pieces as a split nut. In either version the left end face of socket member 171 has a hexagonal opening 174 to receive an Allen wrench for installation.

FIGS. 24-27 illustrate a universal joint for retaining cutter cone 27 on bearing journal 26 while permitting even rotation of the cutter cones after development of misalignment due to wear, for use in larger diameter drill bits which use the liquid lock retention mechanism. In these Figures, the parts which are the same as in the first embodiment are given the same reference numerals and function as in that embodiment.

In FIG. 24, journal recess 262 and cone recess 257 are smooth bores. Cone recess 257 has a counterbore 257a at the end and a circumferential groove 257b adjacent to the open end thereof. The retention mechanism comprises a shaft 183 having end portions of reduced diameter tightly fitted in ball shaped bearing members 265 and 266. Bearing ball member 265 and shaft 283 have a longitudinal passageway 250 intersecting a lateral passageway 251 in shaft 283 for passage of lubricant.

Cylindrically shaped socket member 276 has a spherical inner bearing surface 268, receiving bearing member 266, an smooth external surface 269 to fit snugly in cone recess 257. Socket member 267 is formed as one piece over bearing ball member 266. Snap ring 283a fits groove 257b to secure socket member 267 and bearing 266 in place.

Socket member 271 has a spherical inner bearing surface 272, to receive bearing member 265, and smooth cylindrical external surface 273 to fit tightly in journal recess 262. Socket member 271 is formed as one piece over bearing ball member 265 and has a beveled end portion 285 which facilitates insertion into journal recess 262 and an end passageway 286 open to the end of shaft passage 250. A ball 287 is normally closed against the opening from passageway 286 by spring 288.

Adjacent to beveled end 285 is an undercut region 289 which receives a pair of elastomeric (carbon graphite or bronze filled polymer material, e.g., teflon) seal rings 290. Several small holes 291 extend from the end face of socket member 271 into undercut region 289 to provide for relief of the seal rings 290 at high temperature and pressure by allowing expansion of the seal rings into the holes.

SEQUENCE OF MANUFACTURE AND ASSEMBLY

As described above, the shank body 2, hollow pin 3 and hollow nozzle legs 4 comprising shank body portion are cast as an investment casting with the external male threads 5 (API regulation threads) thereon. No further machining of threads is required, which is a substantial saving in time and cost of producing the drill bit assembly.

Leg members 23 are rough forged and subsequently machined to exact dimensions and surface texture. Leg members 23 may also be produced by investment casting. Each leg member 23 is a one piece bit forging (or casting) comprising a body portion 24 with a depending leg 25 and an inwardly and downwardly extending bearing journal 26 at the lower end thereof. The three bit body portions 24 are ultimately fitted together and welded to form a sub assembly which is in turn welded to shank body portion 1. The outer surface of each depending leg is coated with a suitable hard facing, e.g. tungsten carbide or the like, either prior to or after welding body portions 24 together.

Each cutter cone 27 is prepared for installation by positioning seal ring 59 in peripheral groove 58, sealed by O-ring 58a. Shaft 83 is prepared by placing seal rings 88 in position in groove 87. Shaft 83 is then installed by screwing threaded end portion 83 into threaded recess in cutter cone 27 using a screw driver in slot 86. Thrust washer 97 is then fitted over shaft 83 against the bottom wall of recess 56 and the cutter cone assembly is ready for installation.

The embodiment of FIGS. 20-23 is installed by first threading socket member 167 tightly into threaded cone recess 157 using a spanner wrench. Socket member 167 bottoms out against the shoulder between threaded recess 157 and counterbore 157a with the end of shaft 183 and bearing 166 extending into counterbore 157a.

Then the cutter cone 27 is placed over bearing journal 26 and socket member started into threaded journal recess 162. A long Allen wrench is inserted through passageway 164 into opening 174 and rotated to turn socket member 171 to thread the socket member into threaded journal recess 162. When socket member 171 is fully threaded into journal recess 162, cutter cone 27 is pulled into bearing relation with end thrust bearing 97. At this point, passageway 162 is filled with a liquid lubricant and sealed by threaded plug 68.

The embodiment of FIGS. 24-27 is installed by inserting the beveled end of socket 271 into recess 262 as far as it will go. In this position, peripheral seal 59 is in sliding engagement with 45° boss 60 and pre-loaded by O-ring 58a. End thrust bearing 97 engages the end thrust surface 61 of journal 26 and the bottom wall of recess 56 in cutter cone 27. Seal rings 88 have a tight sliding engagement with the wall of recess 262. The end of socket 271 is spaced from the end wall of recess 262 and defines a locking chamber 101.

A suitable non-volatile liquid, preferably a high temperature lubricant, is introduced to fill locking chamber 101 and passage 64 to the valve opening 66. Ball 67 is dropped into place and plug 68 is inserted. Passage 69 allows excess lubricant and air to bleed out while plug 68 is tightened against ball 67. When fully tightened, plug 68 seals the system tightly, which is completely full of liquid and has no air therein. If desired, a vacuum may be applied to assist in bleeding the system during filling and closing the plug and valve.

The liquid lock produced is substantially as described and claimed in patent application Ser. No. 730,550, now U.S. Pat. No. 4,657,019. This arrangement holds cutter cone 27 on journal 26 without the necessity of using retaining balls or rings. The vacuum produced by any effort to move cutter cone 27 longitudinally on journal 26 retains the cutter cone in position. Elastomeric seal rings 290 prevent leakage of liquid out or air into locking chamber 101.

In both of the embodiments shown in FIGS. 20-23 and in FIGS. 24-27, the universal joint allows smooth rotation of the cutter cone 27 after wear on the inside of the cone or on the bearing journal has caused the cone to rotate about an axis which is displayed from the axis of the bearing journal. The spherical bearings 165 and 166 in sockets 171 and 167 in FIGS. 20 and 21, and the spherical bearings 265 and 266 in sockets 271 and 267 in FIGS. 24 and 25, permit a displacement of the axis of rotation of cutter cone 27 relative to the axis of bearing journal 26 by as much as several degrees.

While this invention has been described fully and completely, with special emphasis on a single preferred embodiment, it should be understood that, within the scope of the appended claims, this invention may be practiced otherwise than as specifically described.

What is claimed is:

1. A method of assembling drill bits, for rotary earth drilling, of the type comprising a bit body having a shank body with a threaded pin adapted to be detachably secured to drill pipe or the like for rotating the bit and delivering drilling fluid to the bit for removal of spoil or cuttings, a plurality of depending leg members at the lower end thereof, each leg member being uniformly spaced from the other leg members, and having an inwardly and downwardly extending bearing journal at the respective lower ends thereof and a plurality of nozzles for exit of drilling fluid from said bit body, and a plurality of roller cutters, one for each leg, each comprising a generally conical cutter body rotatably mounted on the respective journal and a plurality of cutting elements on each cutter body, said method comprising the steps of (a) casting as a single piece a hollow shank body with a threaded hollow pin extending from one side and a plurality of hollow nozzle legs opening from the interior of said hollow pin and extending from the other side of said shank body in the opposite direction from said pin and angled outward from the longitudinal center line thereof, (b) forming as separate pieces said leg members, each leg member comprising a one piece bit body portion with a depending leg and an inwardly and downwardly extending bearing journal at the lower end thereof, (c) forming each bit body portion to fit together to form an assembled bit body sub-assembly with an end wall for said hollow pin and defining peripheral recesses when assembled to receive said hollow nozzle legs, (d) assembling said conical roller cutters on said bearing journals, (e) assembling said bit body portions and welding them together to form said bit body sub-assembly having a body portion fitting the open end of said hollow shank body and having equally spaced peripheral recesses, said legs depending therefrom and having said bearing journals extending inwardly and downwardly at the lower ends thereof, (f) assembling said bit body sub-assembly against the open end of said shank body with said nozzle legs extending through said peripheral recesses, and said bit body closing the open end of said hollow pin, and (g) welding said bit body sub-assembly around the periphery thereof to said shank body.

2. A method of assembling drill bits for rotary earth drilling according to claim 1 in which
said hollow pin on said shank body is cast with API regulation threads requiring no further machining.

3. A method of assembling drill bits for rotary earth drilling according to claim 1 in which
said hollow pin and said shank body are cast as an investment casting.

4. A method of assembling drill bits for rotary earth drilling according to claim 1 in which
said leg members are cast or forged to rough shape and machined to the required finished shape.

5. A method of assembling drill bits for rotary earth drilling according to claim 1 in which
each bit body portion has a recessed edge portion symmetrically located to fit together to form a first recess in said assembled bit body sub-assembly end wall, and
welding said bit body portions together along mating surfaces thereof in said first recess and substantially filling the recess with weld metal.

6. A method of assembling drill bits for rotary earth drilling according to claim 1 in which
said assembled bit body sub-assembly and said hollow shank body are shaped at their mating edges to form a peripheral groove when assembled, and
said assembled bit body sub-assembly and said hollow shank body are welded together along their mating edges in said peripheral groove.

7. A method of assembling drill bits for rotary earth drilling according to claim 5 in which each bit body portion has a recessed edge portion symmetrically located to fit together to form a second recess above said first recess in said assembled bit body sub-assembly end wall, and further including the steps of providing a ceramic or hardmetal insert of a size and shape to fit into said end wall second recess and fitting the same in position to protect against abrasion from drilling fluid flowing through said hollow pin, and assembling said bit body sub-assembly against the open end of said hollow shank body with the peripheral edge of said insert secured therebetween before welding the peripheral edge of said shank body and bit body sub-assembly together.

8. A method of assembling drill bits for rotary earth drilling according to claim 1 further including the step of forming a cylindrical recess in the upper surface of each bit body portion, forming a passage extending from each said cylindrical recess through each bit body portion and its depending leg to open adjacent to the bearing journal at the upper end thereof to provide a passage for lubrication of said conical roller cutters when assembled on said bearing journals, and providing a piston and positioning the same in each said cylindrical recess.

9. A method of assembling drill bits for rotary earth drilling according to claim 8 further including the step of filling said recess and passage with lubricant until said piston is positioned flush with the upper surface of said bit body portion, and providing a passageway in said bit body portion to the exterior surface thereof to conduct fluid pressure from around said bit to the upper surface of said piston to subject lubricant to ambient fluid pressure during use.

10. A method of assembling drill bits for rotary earth drilling according to claim 1 further including the steps of forming a passage extending from the outer surface of each depending leg into its bearing journal at the upper end thereof to provide a passage for introduction of liquid for securing the roller cutters in place when assembled thereon.

11. A method of assembling drill bits for rotary earth drilling according to claim 1 including the step of forming each bit body portion with an arcuate cut out on one edge of a size and shape such that when fit together to form said assembled bit body sub-assembly peripheral recesses offset from the radially extending surfaces which are welded together to produce said assembled bit body sub-assembly and which receive said hollow nozzle legs when assembled to said shank body.

12. A method of assembling drill bits for rotary earth drilling according to claim 1 including the steps of forming a passage extending from the outer surface of each depending leg into its bearing journal at the upper end thereof to provide a passage for introduction of liquid for securing the conical roller cutters in place when assembled thereon, fitting a conical roller cutter over the end of each bearing for rotation thereabout, said roller cutter and bearing being constructed to form a chamber therebetween, introducing a liquid through said second passage to fill said chamber and displace air therefrom, sealing said chamber against leakage of air thereto, and sealing the outer end of said second passage to prevent leakage of air in or liquid out of the chamber to form a liquid lock to hold the cone on the bearing while permitting relative rotary movement between said cone and bearing and preventing any substantial longitudinal movement between said cone and bearing.

13. A method of assembling drill bits for rotary earth drilling according to claim 12 including the steps of forming a first recess in said cone to fit over and rotate on said journal bearing, forming a second recess in said cone in the end wall of said first recess, forming a recess in said journal bearing, providing a shaft member and securing one end thereof in said cone in a fixed non-rotatable position and having its other end extending into the said first recess of said cone, fitting said cone over said bearing and said shaft member into said journal bearing recess, whereby said chamber is formed between the end of said shaft and the end of said journal recess and said shaft member is secured for rotation in said journal bearing.

14. A method of assembling drill bits for rotary earth drilling according to claim 13 further including the step of forming passages extending through each bit body portion and its depending leg to open adjacent to the bearing journal at the upper end thereof to provide a passage for lubrication of said conical roller cutters when assembled on said bearing journals.

15. A method of assembling drill bits for rotary earth drilling according to claim 14 further including the step of forming a passageway from the cylindrical surface of each journal bearing adjacent to said lubrication passage through said journal bearing into said shaft receiving recess, and forming pump means in said shaft cooperable with lubricant supplied through said lubricant passageways for circulating lubricant in response to rotation of said cone.

16. A method of assembling drill bits for rotary earth drilling according to claim 15 in which said shaft on each cone has helical surface passages formed therein comprising said pump means.

17. A method of assembling drill bits for rotary earth drilling according to claim 15 including the steps of forming a conical bearing surface at the intersection of said depending leg portion with the journal bearing extending therefrom, forming a counterbore in the open end of said conical cutter to provide an open peripheral groove, and providing an annular seal member in said cutter peripheral groove with a conical face fitting and sealing against said depending leg conical bearing surface.

18. A method of assembling drill bits for rotary earth drilling according to claim 17 in which said annular seal member comprises a ring of carbon, graphite or other composite refractory material.

19. A method of assembling drill bits for rotary earth drilling according to claim 1 including the steps of providing hard metal nozzle members for each of said hollow nozzle legs, and inserting said nozzle members in the lower ends of said nozzle legs.

20. A method of assembling drill bit body assemblies, for drill bits for rotary earth drilling, of the type comprising a bit body having a shank body with a threaded pin adapted to be detachably secured to drill pipe or the like for rotating the bit and delivering drilling fluid to the bit for removal of spoil or cuttings, a plurality of depending leg members at the lower end thereof, each leg member being uniformly spaced from the other leg members, and having an inwardly and downwardly extending bearing journal at the respective lower ends thereof and a plurality of nozzles for exit of drilling fluid from said bit body, and said bearing journals being adapted to support a plurality of roller cutters, one for each leg, each comprising a generally conical cutter body for rotation thereon, said method comprising the steps of (a) casting as a single piece a hollow shank body with a threaded hollow pin extending from one side and a plurality of hollow nozzle legs opening from the interior of said hollow pin and extending from the other side of said shank body in the opposite direction from said pin and angled outward from the longitudinal center line thereof, (b) forming as separate pieces said leg members, each leg member comprising a one piece bit body portion with a depending leg and an inwardly and downwardly extending bearing journal at the lower end thereof, (c) forming each bit body portion symmetrically to fit together to form an assembled bit body sub-assembly with an end wall for said hollow pin and defining peripheral recesses when assembled to receive said hollow nozzle legs, (d) assembling said bit body portions and welding them together to form said bit body sub-assembly having a body portion fitting the open end of said hollow shank body and having equally spaced peripheral recesses, said legs depending therefrom and having said bearing journals extending inwardly and downwardly at the lower ends thereof, (e) assembling said bit body sub-assembly against the open end of said shank body with said nozzle legs extending through said peripheral recesses, and said bit body closing the open end of said hollow pin, and (f) welding said bit body sub-assembly around the periphery thereof to said shank body.

21. A method according to claim 20 in which said hollow pin on said shank body is cast with API regulation threads requiring no further machining.

22. A method according to claim 20 in which said hollow pin and said shank body are cast as an investment casting.

23. A method according to claim 20 in which said leg members are cast or forged to rough shape and machined to the required finished shape.

24. A method according to claim 20 in which each bit body portion has a recessed edge portion symmetrically located to fit together to form a first recess in said assembled bit body sub-assembly end wall, and welding said bit body portions together along mating surfaces thereof in said first recess and substantially filling the recess with weld metal.

25. A method according to claim 20 in which said assembled bit body sub-assembly and said hollow shank body are shaped at their mating edges to form a peripheral groove when assembled, and said assembled bit body sub-assembly and said hollow shank body are welded together along their mating edges in said peripheral groove.

26. A method according to claim 20 in which each bit body portion has a recess edge portion symmetrically located to fit together to form a second recess above said first recess in said assembled bit body sub-assembly end wall, and further including the steps of providing a ceramic or hardmetal insert of a size and shape to fit into said end wall second recess and fitting the same in position to protect against abrasion from drilling fluid flowing through said hollow pin, and assembling said bit body sub-assembly against the open end of said hollow shank body with the peripheral edge of said insert secured therebetween before welding the peripheral edge of said shank body and bit body sub-assembly together.

27. A method according to claim 20 further including the step of forming a first passage extending through each bit body portion and its depending leg to open adjacent to the bearing journal at the upper end thereof to provide a passage for lubrication of said conical roller cutters when assembled on said bearing journals.

28. A method according to claim 20 including the step of forming each bit body portion with an arcuate cut out on one edge of a size and shape such that when fit together to form said assembled bit body sub-assembly peripheral recesses offset from the radially extending surfaces which are welded together to produce said assembled bit body sub-assembly and which receive said hollow nozzle legs when assembled to said shank body.

29. A method according to claim 20 including the steps of providing hard metal nozzle members for each of said hollow nozzle legs, and inserting said nozzle members in the lower ends of said nozzle legs.

30. A method according to claim 1 including the steps of providing a universal joint for connection of said rolling cutter on said bearing journal, and securing said universal joint in operating relation between said rolling cutter and said bearing journal during assembly, whereby said rolling cutter is supported for even rotation when misalignment occurs as a result of operating wear.

31. A method according to claim 30 including the steps of forming axial bores in the end wall of said bearing journal and said rolling cutter which are aligned when said cutter is assembled on said bearing journal, and said universal joint comprises a shaft with spherical bearing members supported on each end and socket members with spherical internal bearing surfaces substantially surrounding said spherical bearing members in bearing contact therewith, said universal joint being secured by insertion of said socket members in said axial bores on said rolling cutter and said bearing journal.

32. A method according to claim 31 in which said axial bores are each internally threaded, said socket members are externally threaded, one socket member being threaded into said rolling cutter bore, and then the other socket member being threaded into said bearing journal bore to secure said rolling cutter in bearing relation thereon.

33. A method according to claim 32 including the step of forming a passageway from the exterior of said leg member substantially axially of said bearing journal and opening into said bearing journal bore, inserting a wrench through said last named passageway to engage and turn said other socket member and turning the same to thread said other socket member into said bearing journal threaded bore and pull said rolling cutter into bearing relation thereon, and removing said wrench and plugging said last named passageway.

34. A method according to claim 31 in which said axial bores are smooth cylindrical bores, said socket members have cylindrical exterior surfaces fitting said rolling cutter and bearing journal bores, inserting and securing one socket member into said rolling cutter bore, inserting the other socket member into said bearing journal bore to position said rolling cutter on said bearing journal, forming a passage extending from the outer surface of the depending leg into its bearing journal bore at the upper end thereof to provide a passage for introduction of liquid for securing the conical roller cutters in place when assembled thereon, introducing a liquid through said last named passage to fill the chamber formed by the end of said other socket member and the end of said bearing journal bore and displace air therefrom, sealing said chamber against leakage of air thereto, and sealing the outer end of said last named passage to prevent leakage of air in or liquid out of the chamber to form a liquid lock to hold the cutter on the bearing while permitting relative rotary movement between the cutter and bearing and preventing any substantial longitudinal movement therebetween.

35. An earth boring drill bit produced by the method of claim 1.

36. An earth boring drill bit produced by the method of claim 2.

37. An earth boring drill bit produced by the method of claim 3.

38. An earth boring drill bit produced by the method of claim 4.

39. An earth boring drill bit produced by the method of claim 5.

40. An earth boring drill bit produced by the method of claim 6.

41. An earth boring drill bit produced by the method of claim 7.

42. An earth boring drill bit produced by the method of claim 8.

43. An earth boring drill bit produced by the method of claim 9.

44. An earth boring drill bit produced by the method of claim 10.

45. An earth boring drill bit produced by the method of claim 11.

46. An earth boring drill bit produced by the method of claim 12.

47. An earth boring drill bit produced by the method of claim 13.

48. An earth boring drill bit produced by the method of claim 14.

49. An earth boring drill bit produced by the method of claim 15.

50. An earth boring drill bit produced by the method of claim 16.

51. An earth boring drill bit produced by the method of claim 17.

52. An earth boring drill bit produced by the method of claim 18.

53. An earth boring drill bit produced by the method of claim 19.

54. An earth boring drill bit body assembly produced by the method of claim 20.

55. An earth boring drill bit body assembly produced by the method of claim 21.

56. An earth boring drill bit body assembly produced by the method of claim 30.

57. An earth boring drill bit body assembly produced by the method of claim 31.

58. An earth boring drill bit body assembly produced by the method of claim 32.

59. An earth boring drill bit body assembly produced by the method of claim 33.

60. An earth boring drill bit body assembly produced by the method of claim 34.

* * * * *